(12) United States Patent
Strasser et al.

(10) Patent No.: US 6,959,911 B2
(45) Date of Patent: Nov. 1, 2005

(54) VALVE WITH BENDABLE ACTUATING ELEMENT

(75) Inventors: Günther Strasser, Rottenbuch (DE); Josef Vollmer, Bernbeuren (DE); Jochen Schaible, Altensteig (DE)

(73) Assignees: Hygrama AG, Zug (CH); Honeywell GmbH, Emmen (NL)

( * ) Notice: Subject to any disclaimer, the term of this patent is extended or adjusted under 35 U.S.C. 154(b) by 66 days.

(21) Appl. No.: 10/681,333

(22) Filed: Oct. 9, 2003

(65) Prior Publication Data
US 2004/0104369 A1 Jun. 3, 2004

(30) Foreign Application Priority Data
Oct. 15, 2002 (AT) .............................. A 1556/2002

(51) Int. Cl.[7] .......................................... F15B 13/00
(52) U.S. Cl. ................................................ 251/129.06
(58) Field of Search ........................... 251/129.06, 294, 251/303

(56) References Cited
U.S. PATENT DOCUMENTS
6,116,569 A    9/2000  Cox

| | | | | |
|---|---|---|---|---|
| 6,499,509 B2 * | 12/2002 | Berger et al. | ........... | 137/625.65 |
| 6,517,046 B1 * | 2/2003 | Boecking | ............... | 251/129.06 |
| 6,581,638 B2 * | 6/2003 | Frisch et al. | ........... | 137/596.17 |
| 6,616,018 B2 * | 9/2003 | Jonasson et al. | ............ | 222/504 |
| 6,739,575 B2 * | 5/2004 | Cotton et al. | .......... | 251/129.06 |

FOREIGN PATENT DOCUMENTS

| | | |
|---|---|---|
| DE | 19720849 | 1/1998 |
| DE | 20210042 | 10/2002 |
| EP | 1170808 | 1/2002 |

* cited by examiner

Primary Examiner—J. Casimer Jacyna
(74) Attorney, Agent, or Firm—Dykema Gossett PLLC

(57) ABSTRACT

A valve features a deflectable actuating element (1) that controls the movements of at least one actual sealing element (3) for opening and/or closing at least one sealing contour (6), and the actuating element is loaded via an elastic element (5) essentially perpendicularly relative to the direction of the deflection; and the longitudinal axis of the actuating element and the force applied by the elastic element are aligned in a position of the actuating element that is between its two extreme positions. The actuating element (1) is preferably an unilaterally loaded piezoelectric bending transducer, and the sealing element (3) is preferably a toggle that has the ability to swing around an axis arranged perpendicularly relative to the direction of the deflection of the actuating element (1).

12 Claims, 1 Drawing Sheet

VALVE WITH BENDABLE ACTUATING ELEMENT

BACKGROUND OF THE INVENTION

1. Field of the Invention

The invention relates to a valve with a displaceable actuating element that controls the movements of at least one actual sealing element for opening and/or closing at least one sealing contour; and the actuating element is loaded via an elastic element essentially perpendicularly relative to the direction of deflection; and the longitudinal axis of the actuating element and the force applied via the elastic element are aligned in a position of the actuating element that is between its two extreme positions.

2. The Prior Art

In many kinds of valves, the sealing element or an actuating element moving this sealing element is preloaded in one of the two directions via, for example, elastic elements. This preload can, if necessary, also be effected by way of the forces that are generated during the deflection of the sealing or actuating element. But, most of the time, this also has a disadvantageous influence on the switching dynamics of the valve at least in one direction, and much operating energy input of the valve is required in order to overcome the preload.

On the other hand, also known in the art are valve constructions in which, due to the geometry of the sealing or actuating element—if necessary, with the assistance of at least one spring element, the two end positions are stabilized by way of a preload, while it is necessary to overcome the force of an elastic element for the switching action and, after passing through the first section of the total deflection range, the elastic element supports the further switching action. DE 197 20 849 A1 describes a valve of this kind that envisions two actuators for the switching action acting upon the support member for the actual sealing element.

The object of the invention is to provide a valve with a minimal actuating force, i.e., a valve that can be switched applying minimal currents, which is characterized by its small construction size while still providing very high sealing force accompanied by the best possible switching dynamics.

SUMMARY OF THE INVENTION

To achieve this object according to the invention the actuating element is realized as an unilaterally mounted piezoelectric bending transducer, and the sealing element is realized as a toggle that can be rotated around an axis which is arranged perpendicularly relative to the direction of the deflection of the actuating element. These bending transducers, which by and of themselves have been known in the art, supply, due to a very high force density accompanied by minimal triggering power and good switching dynamics, all the prerequisites for a large lift in the presence of minimal dimensions. In conjunction with providing support for holding the toggle in a switching position in which the bending transducer is at rest, it is possible to ensure a secure holding and sealing effect in this position without compromising the switching process or essentially increasing the necessary energy for effecting this process, and minimal displacements of the bending transducer cannot compromise the sealing effect, as, for example, in constructions with actuating elements that act directly upon the valve seat. Even the placement of the actual sealing surface does not change the distance between the actuating element and the toggle in the direction of actuation, which is why the zero-position is preserved. Moreover, the geometric conditions can be utilized to adjust sealing force, deflection range of the sealing element etc. to any requirements in practical applications.

According to an advantageous embodiment of the invention the axis of the toggle is essentially congruent with one sealing edge that constitutes part of at least one sealing contour. This axial placement of the toggle prevents any deflection of the toggle relative to the sealing contour; moreover, it allows for placement of the sealing material without compromising the sealing effect.

According to another characteristic of the invention, the sealing edge is comprised of a central section shared by two sealing contours.

Advantageously, it is envisioned that the sealing edge is available as a line of intersection of two essentially plane sealing contours, and the sealing planes that contain the sealing contours jointly enclose an obtuse angle. The way it is positioned, the sealing surface is able to exactly adapt itself to the respective sealing contour without compromising the respectively other sealing contour, which means that only the most minimal leakage values can be obtained.

Preferably, it is envisioned that the toggle and the bending transducer each feature a connecting location for the elastic element and that this element is mounted between toggle and bending transducer.

According to another advantageous embodiment of the invention, the point of action of the bending transducer on the toggle is arranged outside of the plane(s) of the sealing contour. This way, it is possible to bring forth the force that can be exercised by the bending transducer in the most favorable manner.

According to another variant, it is also possible for the point of action of the elastic element on the toggle to be arranged outside of the plane that is defined by the point of action of the bending transducer on the toggle and the sealing edge.

Another variant according to the invention advantageously envisions that at least two points of action, arranged at a distance relative to each other in the longitudinal direction of the bending transducer, are envisioned on the toggle for the bending transducer. In this way, it is possible to achieve a folding valve characteristic.

The best possible sealing effect in at least one switching position of the valve according to the invention can be achieved when the toggle is preloaded on one sealing contour via the elastic element and that it can be lifted off from out of its resting position on the sealing contour by way of the deflection of the bending transducer.

Another embodied example according to the invention envisions that the toggle is preloaded on one sealing contour via the elastic element and that it can be lifted off from out of its resting position on the sealing contour by way of deflection of the bending transducer and that it rests against the second sealing contour, while exercising a sealing action, in the deflected extreme position of the bending transducer.

Advantageously, the toggle features a depression that engages one end of the bending transducer in order to achieve, correspondingly, optimal utilization of the restoring force of the bending transducer for the switching action of the valve.

The invention will be illustrated in more detail in the subsequent description utilizing the embodiments set forth in the enclosed drawings.

DETAILED DESCRIPTION OF THE PREFERRED EMBODIMENT

Figure 2:
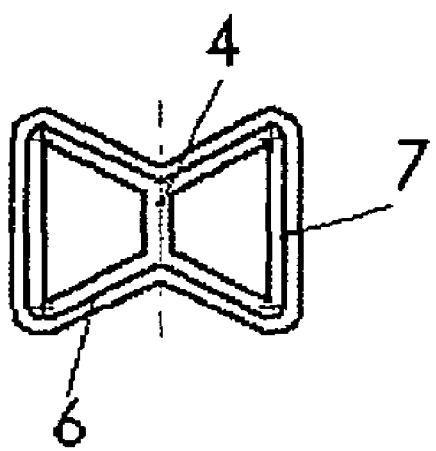
FIG. 2 shows a top view of the sealing contours of the valve in FIG. 1.

A piezoelectric bending transducer 1 is held in place on one of its ends at a mounting location inside the housing 2 of the valve or in a structure that is connected to the housing of the valve. In the resting position shown in FIG. 1, in which no voltage is applied, a minimal play exists between the bending transducer 1 and the toggle 3 as the actual sealing element, which is why small changes with regard to the position of the bending transducer 1 in axial direction but also in the direction of deflection cannot adversely impact the sealing effect.

The toggle 3 is resting on the sealing edge 4, and the sealing edge is almost congruent with the axis of rotation of the toggle. An elastic element, preferably a coil spring 5 that responds to pressure, pushes the toggle 3 against a first sealing contour 6; and the actual sealing surface 3a is able to adjust itself exactly to the sealing contour 6. This coil spring 5 is mounted between the bending transducer 1 and the toggle 3; preferably, the coil spring is attached to both components with the ability to move and its action extends in a parallel direction relative to the longitudinal axis of the bending transducer 1.

The sealing effect is achieved in this switching position by way of the mechanical properties of the bending transducer 1 in the longitudinal direction and due to the effect of the spring coil 5, with the latter being arranged as aligned with the bending transducer 1 or only enclosing an obtuse angle of approximately 180° with it, i.e., its action extends perpendicularly relative to the direction of deflection of the bending transducer 1.

By providing, for example, two points of action of the bending transducer 1 on the toggle 3, which are arranged at a distance of each other in the longitudinal direction of the bending transducer 1, it is possible to generate a folding valve characteristic based on the resulting change of the point of action of the bending transducer 1 and, therefore, the lever conditions on the toggle 3. This means, consequently, in relation to the deflection of the actuating element, with the same deflection lift of the bending transducer 1 taking place, the toggle 3 first performs a minimal movement when the bending transducer 1 contacts the point of action on the toggle 3 that is at a larger distance relative to the sealing edge 4, and it performs a large movement when the contact occurs on the second point of action that is arranged in closer proximity to the sealing edge 4. This way, it is possible to realize a better adjustment to a total system with non-linear characteristics, and a better definition is achieved with the same triggering area.

Figure 1:
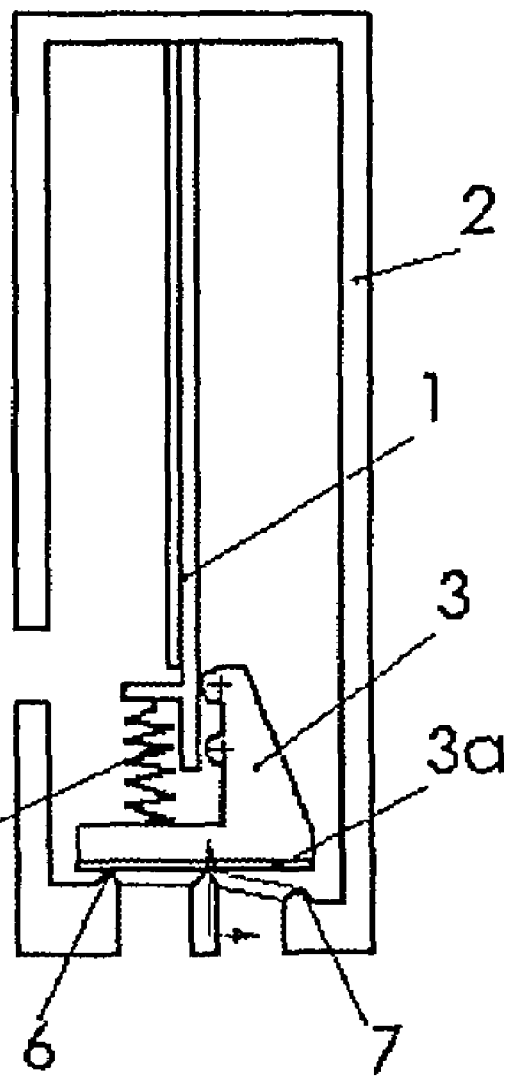
FIG. 1 represents a schematic depiction of a cross-section of an embodied example of the valve according to the invention as a 3/2-way model.

When a voltage is applied, the bending transducer in FIG. 1 is deflected to the right. While performing this movement, the bending transducer works against the coil spring 5 and finally assumes a deflected extreme position in which the toggle 3 and its actual sealing surface 3a are pressed against the second sealing contour 7 while the first sealing contour 6 is released. When the voltage is turned off, thanks to its elasticity, the bending transducer 1 returns to its resting position, and this reset movement is further supported by the effect of the coil spring 5. At the end of the reset movement, preferably, the bending transducer 1 is once again lifted off the toggle 3, and the coil spring 5, that is loaded between the bending transducer 1 and the toggle 3, presses the toggle 3 once again against the first sealing contour 6 while the second sealing contour 7 is released once again.

As can be seen in FIG. 1, the two sealing contours 6, 7 are realized, respectively, as plane; and the sealing planes containing the sealing contours 6, 7 preferably enclose jointly an obtuse angle. This way, it is possible to easily realize the side of the toggle 3 and its sealing surface 3a that are directed toward the sealing contours 6, 7 in a plane manner. In principle, a joint plane for both sealing contours 6, 7 and, correspondingly, a dull tapered realization of the bottom side of the toggle 3 and/or of its sealing surface 3a is also conceivable. In both cases, the sealing surface 3a is able to adjust itself to the respective sealing contour 6 or 7, while, in both switching positions of the valve, it is not being influenced by the respectively other sealing contour.

The friction of the mounting of the toggle 3 is reduced, for the most part, due to the way the sealing edge 4 is realized; and the friction at the points of action of the elastic element 5, which can also be realized as a sheet metal part, on the toggle 3 or the bending transducer 1 can be reduced if these mountings or points of action are embodied as cutting edges.

While the valve that is shown in these variants is a 3/2-way valve, it is also possible to close off one of the two sealing contours 6, 7, or omit it completely, in order to realize a simplified embodied example containing only one controllable sealing contour, thereby realizing a 2/2-way valve.

What is claimed is:

1. Valve with a deflectable actuating element that controls the movements of at least one actual sealing element for opening and/or closing at least one sealing contour, and the actuating element is loaded via an elastic element essentially perpendicularly relative to the direction of the deflection, and the longitudinal axis of the actuating element and the force applied by the elastic element are aligned in a position of the actuating element that is between its two extreme positions wherein the actuating element is realized as a unilaterally mounted piezoelectric bending transducer and wherein the sealing element is realized as a toggle that is arranged with the ability to swing around an axis, and the axis is arranged perpendicularly relative to the direction of the deflection of the actuating element.

2. Valve as claimed in claim 1 wherein the axis of the toggle is essentially congruent with a sealing edge that is part of at least one sealing contour.

3. Valve as claimed in claim 2 wherein the sealing edge is a central section that is shared by two sealing contours.

4. Valve as claimed in claim 3 wherein the sealing edge is present as a line of intersection of two essentially plane sealing contours, and the sealing planes that contain the sealing contours jointly enclose an obtuse angle.

5. Valve as claimed in claim 1 wherein the toggle and the bending transducer feature, respectively, one point of connection for the elastic element and wherein this element is loaded between toggle and bending transducer.

6. Valve as claimed in claim 1 wherein the point of action of the bending transducer on the toggle is arranged outside of the plane(s) of the sealing contour.

7. Valve as claimed in claim 1 wherein the point of action of the elastic element on the toggle is arranged outside of the plane that is defined by the point of action of the bending transducer on the toggle and the sealing edge.

8. Valve as claimed in claim 1 wherein at least two points of action are envisioned on the toggle for the bending transducer which are arranged in the longitudinal direction of the bending transducer and at a distance relative to each other.

9. Valve as claimed in claim 1 wherein the toggle is preloaded on one sealing contour via the elastic element and can be lifted out of its resting position and off that sealing contour due to the deflection of the bending transducer.

10. Valve as claimed in claim 1 wherein the toggle is preloaded on one sealing contour via the elastic element and can be lifted out of its resting position and off that sealing contour due to the deflection of the bending transducer and wherein, in the deflected extreme position of the bending transducer, it rests against the second sealing contour sealing the latter.

11. Valve as claimed in claim 1 wherein the toggle features a depression that engages the one end of the bending transducer.

12. A valve which comprises:
   means providing a first sealing contour, a second sealing contour and a pivot axis therebetween,
   a toggle element that is pivotable on said pivot axis between a first position wherein it seats against said first sealing contour and a second position wherein it seats on said second sealing contour,
   an elongated piezoelectric bending transducer which extends towards said toggle element and is deflectable in a deflection direction perpendicular to a longitudinal axis thereof between two extreme positions, the deflection direction being perpendicular to said pivot axis, and an elastic element which extends between said elongated piezoelectric bending transducer and said toggle to bias said toggle in said first position, a force of said elastic element being parallel with said longitudinal axis when said elongated piezoelectric element is between said two extreme positions thereof.

* * * * *